May 11, 1954
G. E. MORTON
2,677,840
TABLE FORK CLEANER
Filed Jan. 20, 1950
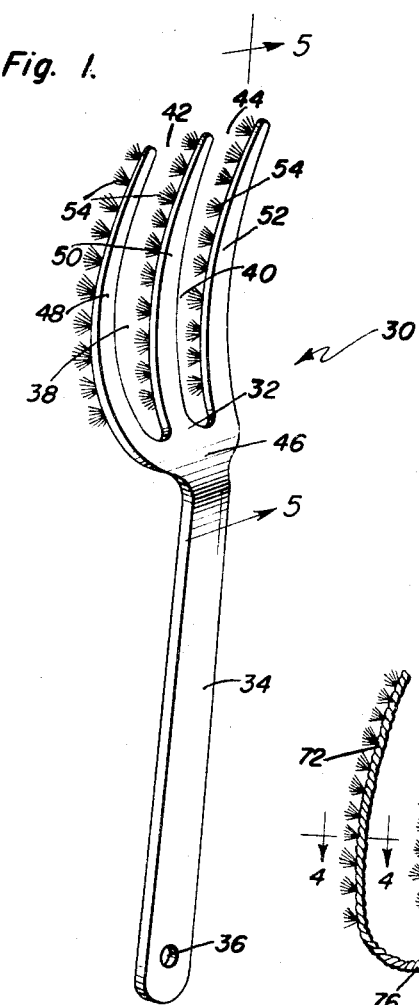
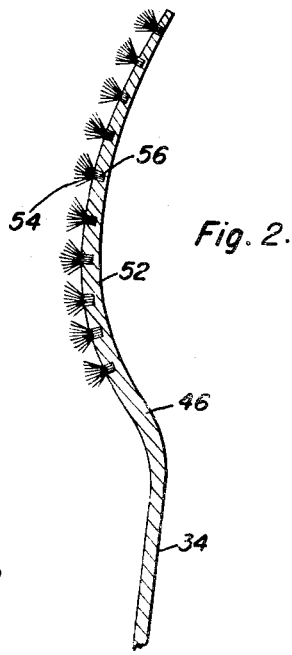
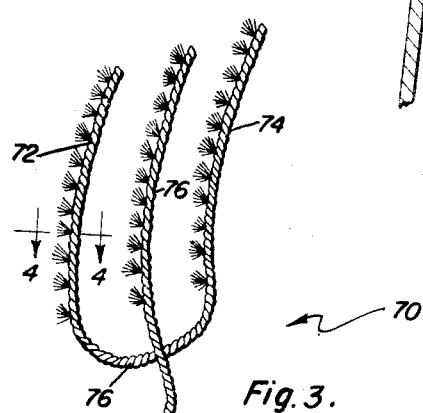
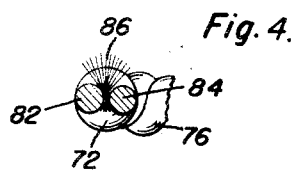
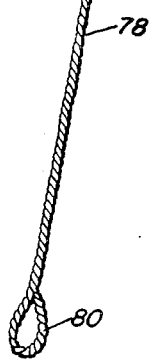
Gordon E. Morton
INVENTOR.
BY Patented May 11, 1954

2,677,840

UNITED STATES PATENT OFFICE 2,677,840

TABLE FORK CLEANER

Gordon E. Morton, Everett, Wash.

Application January 20, 1950, Serial No. 139,667

3 Claims. (Cl. 15—160)

This invention relates to kitchen utensils, and more particularly to a novel brush for scraping and cleaning forks and other like utensils.

And object of the invention is to provide an efficient device for cleaning, scouring and polishing table forks.

Another object of the invention is to provide a table fork cleaner which is designed especially to clean out the dirt and other accumulations that tend to form between the tines of the fork at the base thereof.

The invention contemplates using one of two different species or forms of the table fork cleaner which have three spaced apart rows of brushes and means for easily guiding the brushes between the tines of a fork to clean accumulations of foreign matter therefrom.

Still further objects of the invention reside in the provision of a table fork cleaner, which is strong, durable, highly efficient in operation, simple in construction and manufacture, easy to use, capable of being fabricated from a large number of divergent materials, and relatively inexpensive.

These, together with the various ancillary objects of the invention which will become apparent as the following description proceeds, are attained by the table fork cleaners, preferred embodiments of which have been illustrated, by way of example only, in the accompanying drawings, wherein:

Figure 1 is a perspective view of an embodiment of the invention;

Figure 2 is a sectional detail as taken along line 5—5 in Figure 4;

Figure 3 is a perspective view of a second form of table fork cleaner; and

Figure 4 is an enlarged horizontal sectional detail as taken along line 4—4 in Figure 3.

With reference now, in particular, to that embodiment of the invention as shown in Figures 1 and 2 and generally designated by reference numeral 30, it will be seen that the table fork cleaner in this case comprises a supporting plate or head 32 which is integrally connected to a handle 34 having an aperture 36 in the end thereof remote from the plate 32. A pair of like apertures 38 and 40 are formed in the plate 32 and are open at one end of the plate as at 42 and 44 while extending almost to the arcuate converging portion 46 similar to the portion 22 of the embodiment shown in Figure 1. Because of the apertures 38 and 40, the plate is divided into a series of three tines 48, 50, and 52. A row of bristles 54 is secured to the convex surface of the tines 48, 50 and 52. This may be by suitable adhesive placed on the bristles, and then the bristles are inserted in recesses 56 in the tines 48, 50 or 52. This form of the invention is especially adaptable to clean the dirt that tends to accumulate between the tines at the base thereof.

With reference now to Figures 3 and 4 wherein is shown a second form of the invention generally indicated by reference numeral 70, it will be seen that in this form of the invention the device is formed from twisted wire formed from any convenient metal. A pair of wire prongs 72 and 74 are formed by a substantially U-shaped member which has a central connecting portion 76, the prongs and connecting portion forming the head of the device. Because of the fact that the wires are twisted together from two strands of metal, the prongs will retain the shape to which they are bent.

A third prong 76 is formed at the end of a handle 78 which has an eye 80 integrally formed by the strands of wire. Between the two strands of the wires 82 and 84 are inserted the bristles 86 and a suitable cement may be used to adhesively secure the bristles between the strands 82 and 84. However, the strands will tend to hold the bristles 86 in a secure manner by themselves, since the twisting action thereof will tend to compress the base of the bristles together.

This form of the invention is especially adaptable for cleaning out the dirt which tends to cling to the surface between the tines at the base of a fork.

Since, from the foregoing, the construction and advantages of these metal fork cleaners are readily apparent, further description is believed to be unnecessary.

However, since numerous modifications will readily occur to those skilled in the art after a consideration of the foregoing specification and accompanying drawing, it is not intended to limit the invention to the precise embodiments shown and described, but all suitable modifications and equivalents may be resorted to which fall within the scope of the appended claims.

Having described the invention, what is claimed as new is:

1. A table fork cleaner comprising an elongated implement including a head and a handle connected to the head, said head being of longitudinally arcuated shape conforming to the contour of a table fork, a plurality of longitudinally extending transversely spaced, parallel rows of bristles secured to said head, said rows being transversely spaced from one another approximately the width of a fork tine to guide the tines of a fork therebetween, said head comprising a plurality of tines spaced apart from one another, said bristles being secured to the convex surfaces of said tines whereby they may easily engage a fork at the junction of the fork tines with the fork base.

2. A table fork cleaner comprising an elongated implement including a head and a handle connected to the head, said head being of longitudinally arcuated shape conforming to the contour of a table fork, a plurality of longitudinally extending transversely spaced, parallel rows of bristles secured to said head, said rows being transversely spaced from one another approximately the width of a fork tine to guide the tines of a fork therebetween, said head comprising a plurality of tines spaced apart from one another, said bristles being secured to the convex surfaces of said tines whereby they may easily engage a fork at the junction of the fork tines with the fork base, said handle having an aperture in the end thereof remote from said head for supporting the cleaner.

3. A table fork cleaner comprising an elongated implement including a head and a handle connected to the head, said head being of longitudinally arcuated shape conforming to the contour of a table fork, a plurality of longitudinally extending, transversely spaced, parallel rows of bristles secured to said head, said rows being transversely spaced from one another approximately the width of a fork tine to guide the tines of a fork therebetween, said head comprising a plurality of tines spaced apart from one another, said bristles being secured to the convex surfaces of said tines whereby they may easily engage a fork at the junction of the fork tines with the fork base, said handle having an aperture in the end thereof remote from said head for supporting the cleaner, said handle being integral with said head.

References Cited in the file of this patent
UNITED STATES PATENTS

| Number | Name | Date |
| --- | --- | --- |
| 389,531 | Scott | Sept. 11, 1888 |
| 485,048 | Lehman | Oct. 25, 1892 |
| 624,336 | Hussey | May 2, 1899 |
| 1,007,328 | Brandstetter | Oct. 31, 1911 |
| 1,063,279 | Montgomery | June 3, 1913 |
| 1,195,190 | Dunlap | Aug. 22, 1916 |
| 1,389,957 | Martin | Sept. 6, 1921 |
| 1,507,500 | Metz | Sept. 2, 1924 |
| 1,728,712 | Aberle | Sept. 17, 1929 |
| 1,957,363 | Snell | May 1, 1934 |